J. E. DUSTIN.
Spark-Arresters.
No. 142,904. Patented September 16, 1873.
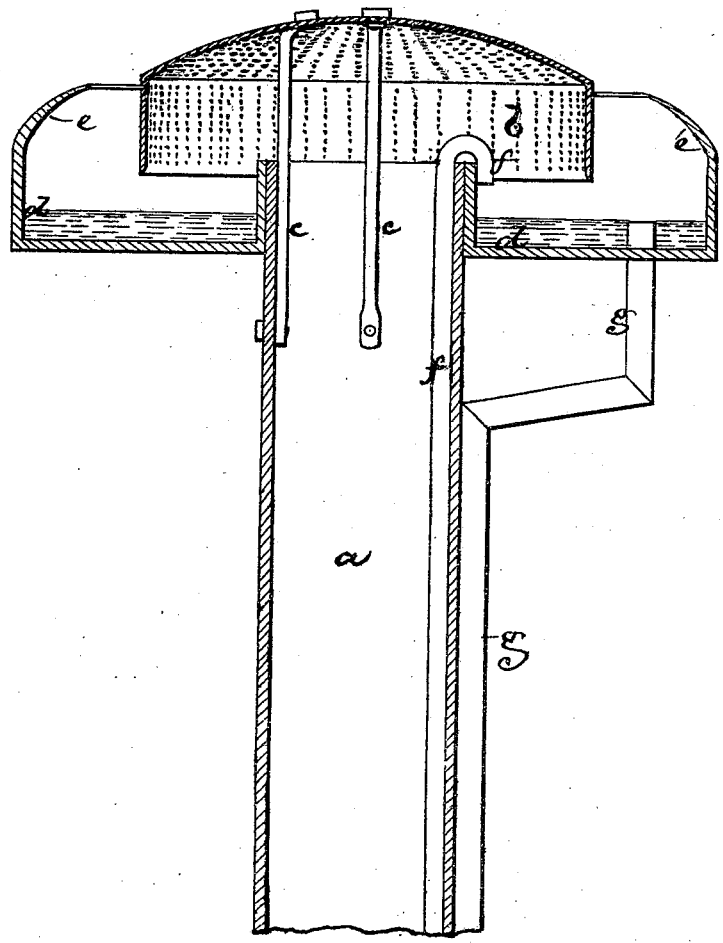
Witnesses.
M. W. Frothingham.
L. H. Latimer.
Inventor,
John E. Dustin
By his Attys.
Crosby & Gould.

UNITED STATES PATENT OFFICE.

JOHN E. DUSTIN, OF WHITEFIELD, NEW HAMPSHIRE, ASSIGNOR TO HIMSELF, ALSON L. BROWN, AND WARREN G. BROWN, OF SAME PLACE, AND AARON ORDWAY, OF LAWRENCE, MASSACHUSETTS.

IMPROVEMENT IN SPARK-ARRESTERS.

Specification forming part of Letters Patent No. 142,904, dated September 16, 1873; application filed May 19, 1873.

*To all whom it may concern:*

Be it known that I, JOHN E. DUSTIN, of Whitefield, in the county of Coos and State of New Hampshire, have invented an Improved Spark-Arrester; and I do hereby declare that the following, taken in connection with the drawings which accompany and form part of this specification, is a description of my invention sufficient to enable those skilled in the art to practice it.

The invention relates to a construction or arrangement of devices for arresting and discharging sparks from steam-boiler furnaces. In my invention I combine with the smoke-stack, and with a perforated bonnet which provides for the escape of the smoke, a water-containing pan or reservoir, into which a supply-pipe enters, from which an escape or discharge pipe leads, the discharge-pipe leaving the reservoir at some distance from the bottom thereof, or at such height that there will always be water in the reservoir. The bonnet deflects the sparks and cinders into the water, and the supply being made continuous, and the discharge-pipe being always open, a current is formed, by which the sparks and cinders, as fast as they collect, are floated or washed into the discharge-pipe. My invention consists in the construction thus generally described.

The drawing represents, in sectional elevation, a smoke-stack embodying my invention.

$a$ denotes the chimney or smoke-stack; $b$, the perforated bonnet surmounting the same, the bonnet being, preferably, supported upon rods $c$ extending up from the top of the pipe $a$. Encompassing the top of the pipe or stack $a$ is the pan or reservoir $d$ for containing water, said reservoir, preferably, having an inwardly-extending flange, $e$. The top of the stack $a$ extends up into the pan, and leading into the pan is a pipe, $f$, which, being connected with a suitable source of water-supply under pressure, furnishes a constantly-flowing supply of water to the reservoir. From the reservoir leads an outlet or discharge pipe, $g$, said pipe leading from the reservoir at such height as to keep a supply of water in the reservoir. As the smoke, sparks, and other products of combustion are driven up the chimney by the draft or the exhaust, the smoke will pass through the bonnet, while the sparks and cinders will be deflected into the water in the reservoir; but, instead of accumulating there, they are washed off with the constantly-flowing current caused by the flow of water into the reservoir from the pipe $f$ and the escape of the water from the reservoir through the discharge-pipe $g$.

The pipe $f$ is shown as passing through the chimney $a$, and over its top down into the reservoir; but both it and the discharge-pipe may be arranged in any suitable manner that will insure a body or certain depth of water in the vessel, and a constant supply and discharge of the water.

I claim—

1. In combination with the stack or chimney $a$ and the perforated deflector $b$, arranged as described, the reservoir $d$, when said reservoir is supplied by a continuous stream of water from a stationary head through supply-pipe $f$, and provided with a discharge-pipe, $g$, to preserve the water at the proper level in the reservoir, and to float off by a continuous current the sparks, cinders, &c.

2. The combination, with the stack, perforated deflector, and the reservoir $d$, supplied from a continuous stream from a stationary or elevated head, and with a discharge-pipe, of a water-supply pipe located within the smoke-stack, substantially as and for the purposes set forth.

Executed this 30th day of April, A. D. 1873.

JOHN E. DUSTIN.

Witnesses:
L. A. DAVIDSON,
S. P. CLARK.